(12) United States Patent
Lu et al.

(10) Patent No.: US 8,568,652 B2
(45) Date of Patent: Oct. 29, 2013

(54) RESIDENT MEASUREMENT SYSTEM FOR CHARGE LEVEL OF BLAST FURNACE

(75) Inventors: Chen-Yuan Lu, Kaohsiung (TW);
Shih-Kang Kuo, Kaohsiung (TW);
Lien-Kuei Chiang, Kaohsiung (TW);
Wen-Chieh Li, Kaohsiung (TW);
Shan-Wen Du, Kaohsiung (TW)

(73) Assignee: China Steel Corporation, Kaohsiung (TW)

( * ) Notice: Subject to any disclaimer, the term of this patent is extended or adjusted under 35 U.S.C. 154(b) by 267 days.

(21) Appl. No.: 12/978,985

(22) Filed: Dec. 27, 2010

(65) Prior Publication Data

US 2011/0193274 A1 Aug. 11, 2011

(30) Foreign Application Priority Data

Feb. 5, 2010 (TW) .............................. 99103585 A

(51) Int. Cl.
*C21B 7/24* (2006.01)

(52) U.S. Cl.
USPC ............................................ 266/99; 266/100

(58) Field of Classification Search
USPC ................. 266/199, 100, 78, 99; 75/460, 458
See application file for complete search history.

(56) References Cited

U.S. PATENT DOCUMENTS

| | | | |
|---|---|---|---|
| 4,123,707 A * | 10/1978 | Fujii et al. ................ | 324/207.16 |
| 4,290,067 A | 9/1981 | Legille et al. | |
| 4,322,627 A * | 3/1982 | Pirlet ....................... | 250/559.23 |
| 4,332,374 A | 6/1982 | Kremer | |
| 4,449,918 A * | 5/1984 | Spahr ............................. | 431/76 |
| 4,858,892 A * | 8/1989 | Kreuz et al. ..................... | 266/99 |
| 6,634,234 B1 | 10/2003 | Haas | |
| 7,879,133 B2 * | 2/2011 | Kuo et al. ....................... | 75/458 |
| 8,052,920 B2 * | 11/2011 | Tsai et al. ..................... | 266/100 |

FOREIGN PATENT DOCUMENTS

| | | |
|---|---|---|
| EP | 0449596 | 10/1991 |
| GB | 2039365 | 8/1980 |
| JP | 54-093378 U | 7/1979 |
| JP | 55-128172 A | 10/1980 |
| JP | 06-011328 A | 1/1994 |

OTHER PUBLICATIONS

Search Report issued on Aug. 4, 2011 by EPO for the corresponding EP Patent Application No. EP11150931.1.
Office Action of the corresponding JP Application No. 2011-016111, dated Feb. 27, 2012, cites JP06-011328, JP54-093378, and JP55-128172.
Office Action and the Search Report issued on Apr. 26, 2013 by TIPO for the corresponding TW Patent Application No. 099103585 which cites US4322627.

* cited by examiner

*Primary Examiner* — Scott Kastler
*Assistant Examiner* — Michael Aboagye
(74) *Attorney, Agent, or Firm* — WPAT, P.C.; Anthony King

(57) ABSTRACT

A resident measurement system for a charge level of a blast furnace includes a chamber, a servo system, a distance measurement unit, and a cooling-cleaning unit. The chamber is combined with a lateral furnace wall of the blast-furnace, covers an opening of the furnace wall, and has a pivoting hole. A pivot of the distance measurement unit is pivotally disposed at the pivoting hole, and the distance measurement unit is driven by the servo system to perform a motion with the pivot as a movement center, so as to measure the charge level. The cooling-cleaning unit is used to supply a high-pressure gas, which flows through the distance measurement unit to perform cooling and cleansing operations. The measurement system is small in dimension, and capable of scanning the charge level in an environment with high temperature, high concentration of dust, and high corrosion in the blast furnace, establishing charge level information into a two-dimensional charge level mode, and obtaining a charge level profile distribution situation in real time, thereby promptly modifying a burden distribution mode.

13 Claims, 4 Drawing Sheets

RESIDENT MEASUREMENT SYSTEM FOR CHARGE LEVEL OF BLAST FURNACE

BACKGROUND OF THE INVENTION

1. Field of the Invention

The present invention relates to a measurement system for a charge level of a blast furnace, and more particularly to a resident measurement system for a charge level of a blast furnace.

2. Description of the Related Art

The charge level profile is a very important condition in blast furnace operation, and changing the burden distribution mode to acquire a reasonable furnace gas distribution is a method which is not only the most cost-efficient but also beneficial. A correct burden distribution mode can facilitate the manufacturing process by, for instance, increasing gas utilization and reducing the thermal load of a furnace wall, so it is one of the most important factors which influence the yield, the furnace lifetime, and the fuel ratio. However, in prior art, the blast furnace is subject to influences of heat radiation, pressure, and dust environment of the furnace top, so it is not easy to measure the charge level profile thereof in the production. In operations of the blast furnace, forming the required charge level shape to control the furnace gas distribution through a proper burden distribution mode is a main means for stabilizing the blast furnace and increasing production efficiency, so it is necessary to continuously measure the online charge level.

The laser distance measurement is usually applied to surface measurement of a large-scale object, such as in the case of civil engineering and construction measurement, historical sites conservation, and pipeline planning of petro-chemical plants. Measurement equipment applied to the blast-furnace further has many limitations in design. Because concentrations of carbon monoxide and dusts in the blast-furnace are very high, in order to prevent poisonous gas from leaking and dust from contaminating the equipment, small openings are dominant in design, which also causes difficulties in design and application. The mechanisms generally adopted by existing commercial optical scanning equipment on the market all utilize a reflective mirror with a rotatable mechanism, so as to generate scanning motions. However, commercial scanners are mostly all-purpose devices, which are disposed in an open space to perform measurement and are not designed to withstand specific interferences in the surrounding environment, such as high temperature, high-concentration dust, and high moisture. Furthermore, the opening of a scanner for blast furnace has to be as small as possible to avoid damage by high temperature, dust and corrosive gas, which would make a general commercial optical scanner unable to perform charge level measurement in the blast furnace.

Therefore, it is necessary to provide a resident measurement system for a charge level of a blast furnace.

SUMMARY OF THE INVENTION

The present invention provides a resident measurement system for a charge level of a blast furnace, which is disposed at an opening of a lateral furnace wall at the top of the blast furnace. The measurement system includes a chamber, a servo system, a distance measurement unit, and a cooling-cleaning unit. The chamber is combined with the furnace wall and covers the opening, and the chamber has a pivoting hole. The servo system is disposed in the chamber, and includes a power device, a transmission element, and a movable bridge assembly, wherein the power device drives the transmission element, the movable bridge assembly is driven by the transmission element to perform a motion in a first direction, the movable bridge assembly includes a slide rod, a slide seat, and a connecting rod having a first end and a second end opposite to the first end, the slide seat rotates around the slide rod, and the first end of the connecting rod is connected to the slide seat. The distance measurement unit has a pivot, which is pivotally disposed at the pivoting hole and located within the opening. The distance measurement unit is connected to the second end of the connecting rod, and is driven by the connecting rod to perform a motion with the pivot as a movement center, so as to scan and measure the location and shape of the charge level. The cooling-cleaning unit is connected to the distance measurement unit, and is used to supply a high-pressure gas, which is introduced into the blast furnace through the distance measurement unit.

The measurement system of the present invention is small in dimension, so it only needs an opening with a small dimension is on the furnace wall of the blast furnace (in practice, an opening with a diameter of about 0.4 meter would be enough, while in prior art, an opening with a diameter of more than 1.2 meters is required), so as to accommodate the measurement system. Furthermore, the cooling-cleaning unit can utilize the high-pressure gas to cool and cleanse the distance measurement unit, so that the resident measurement system for the charge level of the blast furnace according to the present invention can scan the charge level in the blast furnace without the influence of high temperature, high-concentration dust, or high-corrosion environment in the blast furnace, establish the scanned charge level information into the two-dimensional charge level mode, and transfer the measured charge level profile to the man-machine operation device through the data transmitting device, so as to obtain a charge level profile distribution situation in real time. The measurement system can also confirm the charge level result of each batch of burden distribution for the operator, thereby promptly modifying the burden distribution mode, while the database records the charge level result of the each burden distribution.

Additionally, because the cooling-cleaning unit can cleanse the measurement orifice of the distance measurement unit, the measurement orifice can avoid being masked by dust contaminants or clogged by dust slag in the blast furnace, so as to avoid influencing or blocking the measurement path of the distance measurement device. Further, the detection valve of the present invention can detect poisonous gas in the chamber, so as to ensure the safety of the maintenance personnel.

DETAILED DESCRIPTION OF THE INVENTION

Figure 1:
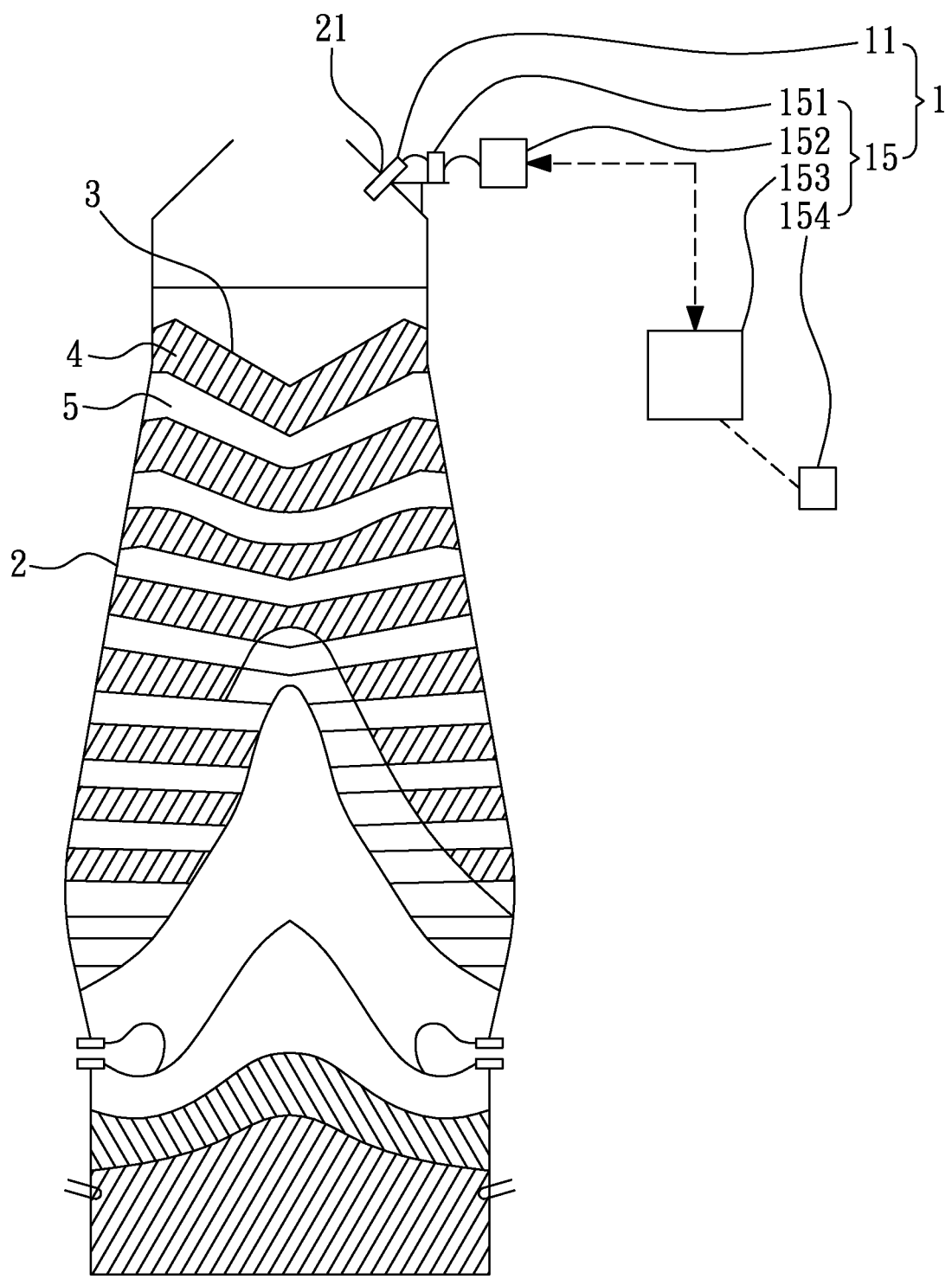
FIG. 1 is a schematic view of a resident measurement system for a charge level of a blast furnace applied to a blast furnace according to the present invention.

FIG. 1 is a schematic view of a resident measurement system for a charge level of a blast furnace applied to a blast furnace according to the present invention. As shown in FIG. 1, the resident measurement system 1 for the charge level of the blast furnace is combined with a blast furnace 2. A lateral furnace wall at the top of the blast-furnace 2 has an opening 21, and the charge level 3 is a top side formed after iron ore 4 and coke 5 in the blast furnace 2 are delaminated and stacked.

Figure 2:
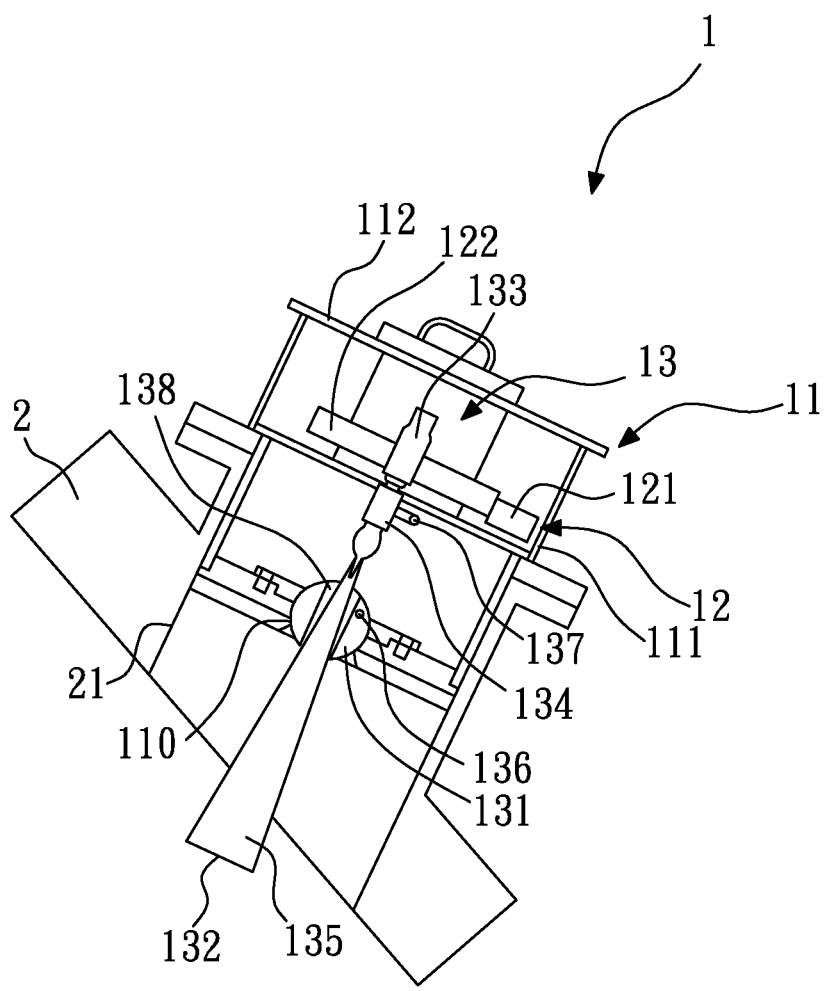
FIG. 2 is a partial schematic view of a resident measurement system for a charge level of a blast furnace combined with a blast furnace opening according to the present invention.
Figure 3:
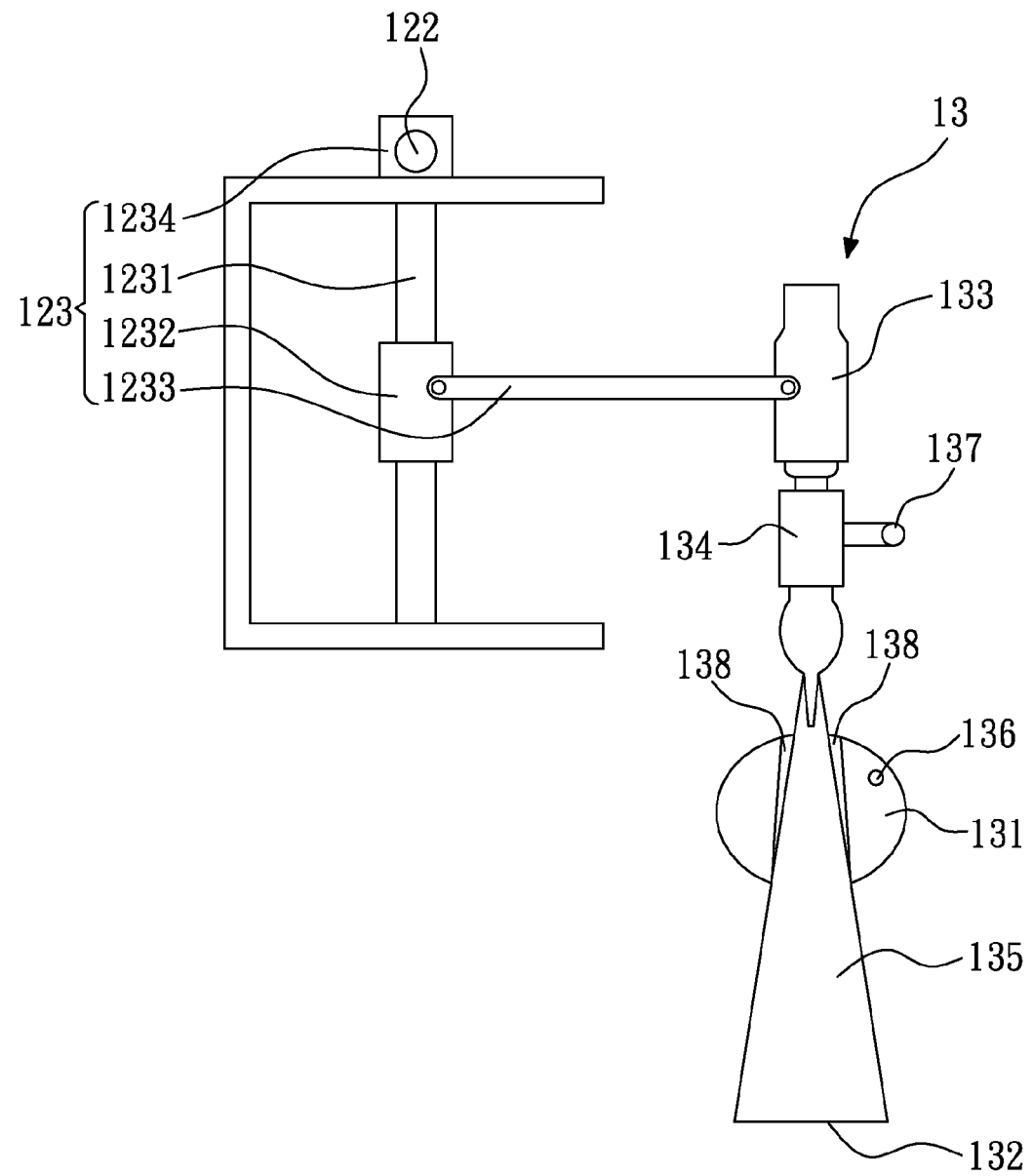
FIG. 3 is a schematic view of a configuration of a servo system and a distance measurement unit of a resident measurement system for a charge level of a blast furnace according to the present invention.
Figure 4:
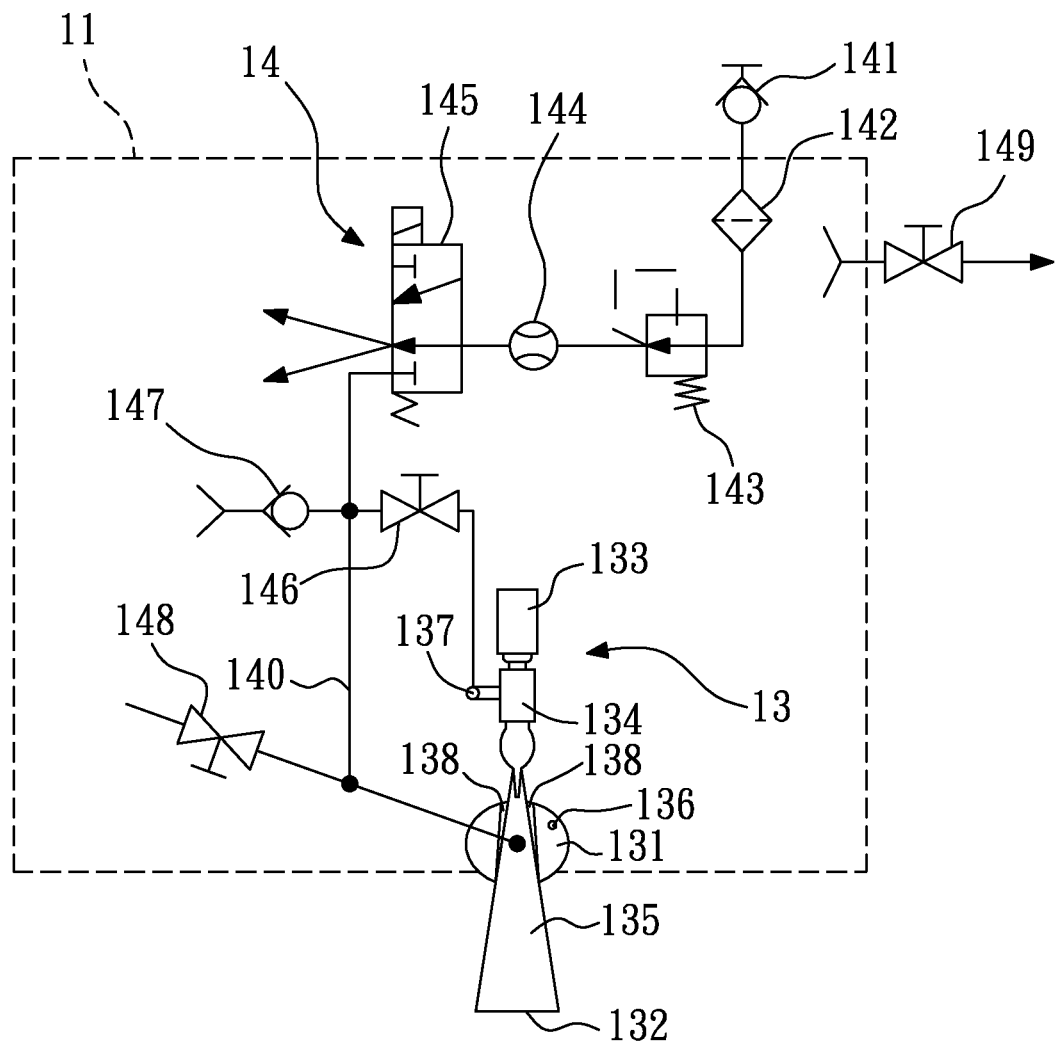
FIG. 4 is a schematic view of a configuration of a cooling-cleaning unit and a distance measurement unit according to the present invention.

FIG. 2 is a partial schematic view of a resident measurement system for a charge level of a blast furnace combined with a blast furnace opening according to the present invention; FIG. 3 is a schematic view of a configuration of a servo system and a distance measurement unit of a resident measurement system for a charge level of a blast furnace according to the present invention; and FIG. 4 is a schematic view of a configuration of a cooling-cleaning unit and a distance measurement unit according to the present invention. As shown in FIGS. 1 to 4, in this embodiment, the measurement system 1 includes: a chamber 11, a servo system 12, a distance measurement unit 13, a cooling-cleaning unit 14, and a data processing-controlling unit 15. The chamber 11 is combined (such as threaded) with the furnace wall and covers the opening 21, a part of the chamber 11 is located in the opening 21, and the chamber 11 has a pivoting hole 110. Preferably, the chamber 11 includes a groove 111 and a lid 112, and the lid 112 and the groove 111 are movably combined or dismantled, for convenience of maintenance and replacement of elements in the chamber 11. In this embodiment, the lid 112 is placed above and covers the groove 111, so as to form the hermetic chamber 11.

As shown in FIGS. 2 and 3, the servo system 12 is disposed in the chamber 11. In this embodiment, the servo system 12 includes a power device 121, a transmission element 122, and a movable bridge assembly 123. The power device 121 drives the transmission element 122, and the movable bridge assembly 123 is driven by the transmission element 122 to perform a motion in a first direction (a direction vertical to the paper surface in FIG. 3). The movable bridge assembly 123 includes a slide rod 1231, a slide seat 1232, and a connecting rod 1233 having a first end and a second end opposite to the first end. The slide seat 1232 rotates around the slide rod 1231, and the first end of the connecting rod 1233 is connected to the slide seat 1232. The connecting rod 1233 is movably pivoted with the slide seat 1232 and the distance measurement unit 13.

Preferably, the power device 121 is a server motor, the transmission element 122 is a threaded rod, the movable bridge assembly 123 can include a movable block 1234 having inner threads, and the inner threads are matched with threads of the threaded rod.

In this embodiment, the distance measurement unit 13 has a pivot 131, a measurement orifice 132, a distance measurement device 133, a connecting element 134, and a tubular element 135. The pivot 131 is pivotally disposed at the pivoting hole 110 and is located within the opening 21, and has a through-hole 136. The distance measurement unit 13 is connected to the second end of the connecting rod 1233, and is driven by the connecting rod 1233 to perform a motion with the pivot 131 as a movement center, so as to scan and measure the location and shape of the charge level 3. Take FIG. 3 as an example, because the connecting rod 1233 is movably pivoted to the slide seat 1232 and the distance measurement unit 13, when the movable block 1234 moves towards a direction shooting out of the paper surface, the slide seat 1232 rotates towards a direction entering the paper surface, a part of the distance measurement unit 13 located above the pivot 131 swings towards the direction shooting out of the paper surface, and meanwhile a part of the distance measurement unit 13 located below the pivot 131 swings towards the direction entering the paper surface, so that the distance measurement unit 13 performs a motion with the pivot 131 as the movement center, so as to scan and measure the charge level.

Through connection and cooperation between the movable bridge assembly 123 and the distance measurement unit 13, the resident measurement system 1 for the charge level of the blast furnace according to the present invention is able to achieve a wide scanning angle in a small movement space.

The connecting element 134 is connected to the distance measurement device 133, and the connecting element 134 has an input end 137. The tubular element 135 passes through the pivot 131 and is connected to the connecting element 134 of the distance measurement device 13, and the measurement orifice 132 is an opening of the tubular element 135 herein, and is located in the blast furnace 2.

In this embodiment, a gap 138 exists between the tubular element 135 and the pivot 131. The distance measurement device 133 scans and measures the charge level 3 through the tubular element 135. To suit the needs of different measurements, the distance measurement device 133 can be a laser distance measurement device, a microwave distance measurement device, or an ultrasonic distance measurement device.

As shown in FIGS. 1 to 4, the cooling-cleaning unit 14 is connected to the distance measurement unit 13, and is used to supply a high-pressure gas, which is introduced into the blast furnace 2 through the pivot 131 or the tubular element 135. In this embodiment, the cooling-cleaning unit 14 includes a gas inlet valve opening 141, a filter 142, a pressure-reducing valve 143, a throttle valve 144, a directional valve 145, a cleaning valve 146, a check valve 147, a cleansing valve 148, and a detection valve 149. The gas inlet valve opening 141 and the detection valve 149 are disposed outside the chamber 11, and the filter 142, the pressure-reducing valve 143, the throttle valve 144, the directional valve 145, the cleaning valve 146, the check valve 147, and the cleansing valve 148 are disposed in the chamber 11.

The high-pressure gas is introduced into the gas inlet valve opening 141 and enters the filter 142, and the filter 142 is used to filter impurities in the high-pressure gas. Then, the high-pressure gas enters the pressure-reducing valve 143, and the pressure-reducing valve 143 is used to reduce and control the pressure of the high-pressure gas. Then, the high-pressure gas enters the throttle valve 144, and the throttle valve 144 is used to control the flow of the gas entering the directional valve 145. Then, the high-pressure gas enters the directional valve 145 (a three-way valve in this embodiment), and the directional valve 145 is used to control the high-pressure gas entering the chamber 11 or the pivot 131 and then introduced into the blast furnace 2.

When the chamber 11 is closed, the directional valve 145 controls the high-pressure gas which enters the chamber 11, is introduced into the input end 137 through the check valve 147 and the cleaning valve 146, and then passes through the connecting element 134, the tubular element 135, and the measurement orifice 132 to enter the blast furnace 2. Additionally, the high-pressure gas passing through the connecting element 134 can be introduced into the blast furnace 2 through a gap between the tubular element 135 and the pivot 131, thereby cooling the tubular element 135. When the chamber 11 is opened for maintenance, the directional valve 145 is switched so that the high-pressure gas directly passes through the through-hole 136 through a pipe passage 140, then through the pivot 131, the measurement orifice 132, and enters the blast-furnace 2, so as to prevent poisonous gas with a positive pressure in the blast furnace 2 from being refluxed when the chamber 11 is opened.

The cleaning valve 146 is used to enable the high-pressure gas passing through the check valve 147 from the chamber 11 to spray the distance measurement unit 13, so as to prevent it from being masked by dust contaminants in the blast furnace 2. The cleansing valve 148 is in communication with the through-hole 136 of the pivot 131, and when the measurement orifice 132 is closed by dust slag in the blast-furnace 2 for use over a long time, cleansing can be performed during furnace shut-down of the blast furnace 2, for example, a soft rod can enter the through-hole 136 through the cleansing valve 148, so as to curette the dust slag of the measurement orifice 132.

In this embodiment, the detection valve 149 is inserted through one sidewall of the chamber 11, and is used to detect the type of gas (such as whether it is poisonous) in the chamber 11. The detection valve 149 is provided, so that before the chamber 11 is opened for maintenance after the furnace shut-down of the blast furnace 2, maintenance personnel can first let out a little of the gas in the chamber 11 to determine whether poisonous gas exists in the chamber 11, thus avoiding damage caused by prematurely opening the chamber 11.

The data processing-controlling unit 15 is used to control the distance measurement unit 13 to measure the charge level 3, and process charge level information (to establish a two-dimensional charge level mode, for example) detected by the distance measurement unit 13. In this embodiment, the data processing-controlling unit 15 includes a data processing device 151, a data transmitting device 152, a man-machine operation device 153, and a database 154. The data processing device 151 is used to convert the charge level information from the distance measurement device 13 (transmitted in a wired or wireless manner) into coordinate information, the data transmitting device 152 transmits (in a wired or wireless manner) the coordinate information to the man-machine operation device 153 (such as a computer), the man-machine operation device 153 is used to control the distance measurement unit 13 to measure the charge level 3 and monitor a measurement result of the charge level 3, and the database 154 (receiving data in a wired or wireless transmitting manner) is used to store the measurement result of the charge level 3.

It is emphasized that, in the measurement system 1 for the blast furnace charge level according to the present invention, the control modes include an automatic measurement mode and a manual measurement mode. In the automatic measurement mode, feed (iron ore 4 and coke 5) information provided by the man-machine operation device 153 is used as a triggering signal of charge level measurement, so as to automatically perform a charge level measurement step. In the manual measurement mode, when an operator considers that it is necessary to trigger the blast furnace charge level measurement system 1 to perform a single charge level profile measurement, forced triggering can be performed through the man-machine operation device 153, so as to perform the single charge level measurement step.

The measurement system 1 of the present invention is small in dimension, so it only needs an opening 21 with a small dimension on the furnace wall of the blast furnace 2 (in practice, an opening with a diameter of only about 0.4 meter would be enough, while in prior art, an opening with a diameter of more than 1.2 meters is required), so as to accommodate the measurement system 1. Furthermore, the cooling-cleaning unit 14 can utilize the high-pressure gas to cool and cleanse the distance measurement unit 13, so the resident measurement system 1 for the charge level of the blast furnace according to the present invention can scan the charge level 3 in the blast-furnace 2 without the influence of high temperature, high-concentration dust, and high-corrosion environment in the blast furnace 2, establish the scanned charge level information into the two-dimensional charge level mode, and transfer the measured charge level profile to the man-machine operation device 153 through the data transmitting device 152, so as to obtain a charge level profile distribution situation in real time. The measurement system can also confirm the charge level result of each batch of burden distribution for the operator, thereby promptly modifying the burden distribution mode, while the database 154 records the charge level result of the each burden distribution.

Additionally, because the cooling-cleaning unit 14 can cleanse the measurement orifice 132 of the distance measurement unit 13, the measurement orifice 132 can avoid being masked by dust contaminants or clogged by dust slag in the blast furnace 2, so as to avoid influencing or blocking the measurement path of the distance measurement device 133. Further, the detection valve 149 of the present invention can detect poisonous gas in the chamber 11, so as to ensure the safety of maintenance personnel.

While embodiments of the present invention have been illustrated and described, various modifications and improvements can be made by those skilled in the art. The embodiments of the present invention are therefore described in an illustrative but not restrictive sense. It is intended that the present invention is not limited to the particular forms illustrated, and that all modifications that maintain the spirit and scope of the present invention are within the scope defined in the appended claims.

What is claimed is:

1. A resident measurement system for a charge level of a blast furnace, disposed at an opening of a lateral furnace wall at the top of the blast furnace, comprising:
   a chamber, combined with the furnace wall and covering the opening, wherein the chamber has a pivoting hole;
   a servo system, disposed in the chamber, and comprising a power device, a transmission element, and a movable bridge assembly, wherein the power device drives the transmission element, the movable bridge assembly is driven by the transmission element to perform a first motion in a first direction, the movable bridge assembly comprises a slide rod, a slide seat, and a connecting rod having a first end and a second end opposite to the first end, the slide seat rotates around the slide rod, and the first end of the connecting rod is connected to the slide seat;
   a distance measurement unit, having a pivot member across the pivoting hole and located within the opening, the distance measurement unit is connected to the second end of the connecting rod, and is driven by the connecting rod to perform a motion with the pivot as a movement center, so as to scan and measure the location and shape of the charge level, wherein the distance measurement unit further comprises a distance measurement device and a tubular element, and the tubular element passes through the pivot member and is connected to the distance measurement device; and
   a cooling-cleaning unit, connected to the distance measurement unit, for supplying a high-pressure gas, wherein the high-pressure gas is introduced into the blast furnace through the distance measurement unit.

2. The measurement system according to claim 1, wherein the chamber has a groove and a lid, and the lid and the groove are movably combined or dismantled.

3. The measurement system according to claim 1, wherein the power device is a server motor.

4. The measurement system according to claim 1, wherein the transmission element is a threaded rod, the movable bridge assembly further comprises a movable block with inner threads, and the inner threads are matched with threads of the threaded rod.

5. The measurement system according to claim 1, wherein the connecting rod is movably pivoted to the slide seat and the distance measurement unit.

6. The measurement system according to claim 1, wherein the distance measurement device is a laser distance measurement device, a microwave distance measurement device, or an ultrasonic distance measurement device.

7. The measurement system according to claim 1, wherein the distance measurement unit further comprises a connecting element, the connecting element is connected to the distance measurement device and the tubular element and has an input end, and the pivot has a through-hole; the cooling-cleaning unit further comprises a gas inlet valve opening, a filter, a pressure-reducing valve, a directional valve, a cleaning valve, and a check valve, the gas inlet valve opening is disposed out of the chamber, the filter, the pressure-reducing valve, the directional valve, the cleaning valve, and the check valve are disposed in the chamber, the high-pressure gas enters through the gas inlet valve opening, passes through the filter, the pressure-reducing valve, and the directional valve sequentially, then enters the chamber, passes through the check valve and the cleaning valve, and is introduced into the input end, so as to enter the blast-furnace through the tubular element, or the high-pressure gas directly passes through the pivot through the through-hole, and then enters the blast furnace.

8. The measurement system according to claim 7, wherein the cooling-cleaning unit further comprises a throttle valve disposed between the pressure-reducing valve and the directional valve.

9. The measurement system according to claim 7, wherein the cooling-cleaning unit further comprises a cleansing valve in communication with the through-hole.

10. The measurement system according to claim 7, wherein the cooling-cleaning unit further comprises a detection valve inserted through a sidewall of the chamber and used to detect the type of gas in the chamber.

11. The measurement system according to claim 1, further comprising a data processing-controlling unit, for controlling the distance measurement unit to measure the charge level, and processing charge level information detected by the distance measurement unit.

12. The measurement system according to claim 11, wherein the data processing-controlling unit further comprises a data processing device, a data transmitting device, and a man-machine operation device, the data processing device is used to convert the charge level information from the distance measurement device into coordinate information, the data transmitting device transmits the coordinate information to the man-machine operation device, and the man-machine operation device is used to control the distance measurement unit for the charge level and to monitor the charge level measurement result.

13. The measurement system according to claim 12, wherein the data processing-controlling unit further comprises a database for storing the charge level measurement result.

* * * * *